United States Patent [19]

Tong

[11] Patent Number: 5,636,994

[45] Date of Patent: Jun. 10, 1997

[54] INTERACTIVE COMPUTER CONTROLLED DOLL

[76] Inventor: Vincent M. K. Tong, 6363 Christie Ave., #904, Emeryville, Calif. 94608

[21] Appl. No.: 556,259

[22] Filed: Nov. 9, 1995

[51] Int. Cl.$^6$ .............................. G09B 5/06; A63H 3/28; A63H 3/48; G09F 19/08
[52] U.S. Cl. .......................... 434/308; 446/298; 446/301
[58] Field of Search ............................................... 434/308

[56] References Cited

U.S. PATENT DOCUMENTS 4,786,967  11/1988  Smith, III et al. .
4,846,693  7/1989   Baer .
4,875,096  10/1989  Baer et al. .

*Primary Examiner*—Richard J. Apley
*Assistant Examiner*—John E. Rovnak
*Attorney, Agent, or Firm*—Flehr Hohbach Test Albritton & Herbert LLP

[57] ABSTRACT

Interactive system which includes a computer having a video output display and a pair of audio output channels. A program source such as a CD-ROM contains information which is processed by the computer to provide a visual presentation on the display and audio signals in the audio output channels, and at least one input device is connected to the computer for controlling the manner in which the program information is processed and the audio signals are delivered to the audio output channels. One speaker is connected to the computer for reproducing sounds represented by the audio signals in one of the audio output channel, and the audio signals in the other channel are applied to at least one transducer in an animated doll.

In the disclosed embodiments, the transducers in the doll include a speaker for reproducing sounds to be made by the doll and actuators for moving parts of the doll such as the mouth and eyes in accordance with those sounds. In some embodiments, a second doll is provided, and the audio signals are selectively applied to the transducers in the two dolls. In some embodiments, a microphone is carried by the doll, and the signals applied to the doll are controlled at least in part by words spoken into the microphone. In some embodiments, the doll is connected to the computer by an umbilical cord, and in others a wireless communication link is provided between the computer and the doll so there is no physical connection between the computer and the doll.

17 Claims, 5 Drawing Sheets

INTERACTIVE COMPUTER CONTROLLED DOLL

This invention pertains generally to personal computers and interactive toys and, more particularly, to a system in which a three-dimensional articulating doll appears to interact with a person operating a computer.

U.S. Pat. No. 4,846,693 shows a system (sometimes referred to as "TV Bear") in which the eyes and mouth of an animated doll such as a toy bear move in response to audio signals applied to a standard television receiver by a video cassette recorder (VCR) or a video disc player. The bear has the appearance of talking with other characters on the TV screen, and a child or other viewer can influence the actions of the bear as well as what is displayed on the screen by manipulation of a control device connected between the VCR and the television receiver.

The effect is created by reproducing the sounds associated with the bear through a speaker in the bear and reproducing other sounds through the speaker in the TV receiver. The division of signals between the two speakers is controlled by digital control signals embedded in the video signal which is delivered to the TV receiver from the control unit.

The TV Bear has a number of limitations and disadvantages. It is limited to use with a television receiver and requires a separate control box, much like an old-fashioned dedicated video game. It also requires substantial extra circuitry first to embed the control signals in the video signal and then to decode them.

It is in general an object of the invention to provide an new and improved system in which a person appears to interact with a three-dimensional animated doll.

Another object of the invention is to provide a system of the above character which overcomes the limitations and disadvantages of systems heretofore provided.

Another object of the invention is to provide a system of the above character which utilizes a personal computer.

These and other objects are achieved in accordance with the invention by providing an interactive system comprising a computer having a video output display and first and second audio output channels, a program source containing information which is processed by the computer to provide a visual presentation on the display and audio signals in the audio output channels, at least one input device connected to the computer for controlling the manner in which the program information is processed and the audio signals are delivered to the audio output channels, a speaker connected to the computer for reproducing sounds represented by the audio signals in the first audio output channel, and an animated doll having at least one transducer responsive to the audio signals in the second audio output channel.

In the disclosed embodiments, the transducers in the doll include a speaker for reproducing sounds to be made by the doll and actuators for moving parts of the doll such as the mouth and eyes in accordance with those sounds. In some embodiments, a second doll is provided, and the audio signals are selectively applied to the transducers in the two dolls. In some embodiments, a microphone is carried by the doll, and the signals applied to the doll are controlled at least in part by words spoken into the microphone. In some embodiments, the doll is connected to the computer by an umbilical cord, and in others a wireless communication link is provided between the computer and the doll.

Figure 1:
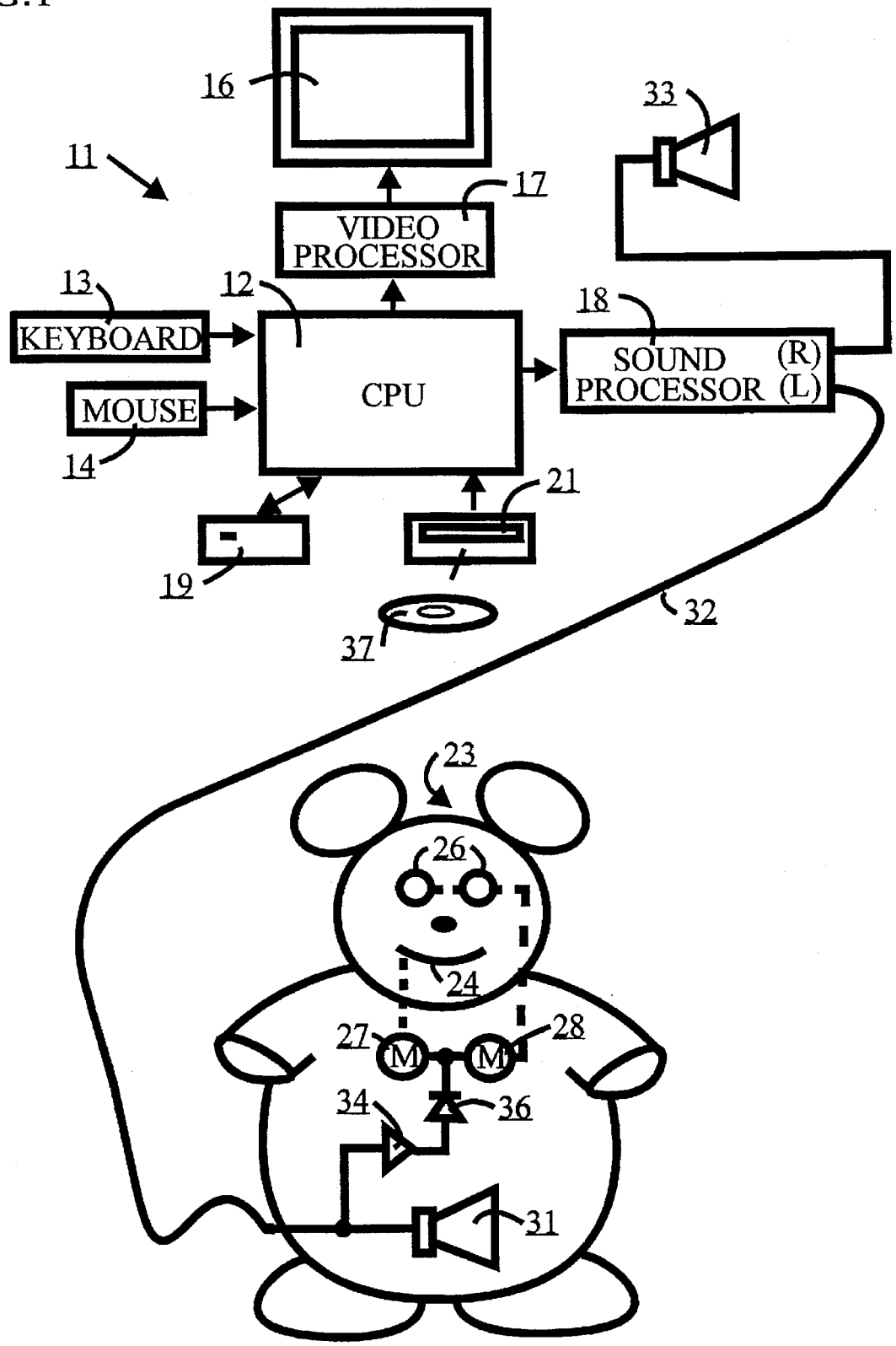
FIG. 1 is a block diagram of one embodiment of an interactive system according to the invention.

As illustrated in FIG. 1, the system includes a personal computer 11 of known design. The computer includes a central processing unit (CPU) 12, a keyboard 13, a mouse 14, and a video display monitor 16. The CPU includes a microprocessor with the usual associated memory and means such as a hard disk for more permanent storage of programs and data.

The computer also includes a video processor 17 and a sound processor 18 which typically are included on the motherboard of the CPU or on cards which plug into the motherboard. The video processor provides signals to the video display monitor, and the sound processor delivers audio output signals to a pair of output channels which are commonly referred to as a left channel (L) and a right channel (R).

Programming information and data are supplied to the computer through suitable means such as a floppy disk drive 19, a CD-ROM drive 21 and/or other removable storage devices. Alternatively, programming information and data can be downloaded through a modem (not shown) or other communications device.

An animated doll 23 is controlled by the computer. In the embodiment of FIG. 1, the doll is in the form of a three dimensional stuffed bear of the type commonly referred to as a plush toy. However, the term is used broadly and includes any type of figure or character desired.

The doll has at least one articulating element, and in the embodiment illustrated, the mouth 24 and eyes 26 of the bear can move. If desired, other elements such as the eyebrows and the legs of the bear can also be movable. Actuators in the form of drive motors 27, 28 are mounted inside the bear and operably connected to the mouth and eyes for moving those elements back and forth.

A speaker 31 is mounted within the bear for reproducing sounds associated with the bear, and by moving the mouth of the bear in accordance with the sounds, an appearance is created that the bear is talking or making the sounds.

Signals for driving the speaker and the drive motors are obtained from the left audio output channel (L), and in the embodiment of FIG. 1, those signals are delivered to the bear over a flexible cable or umbilical cord 32 which extends between the output jack for the right channel and the bear. The right output channel of the audio processor is connected to a speaker 33 which is located in proximity to the monitor.

Within the bear, the cable is connected to speaker 31 and to an amplifier 34 and rectifier 36. The amplifier increases the level of the audio signal, and the rectifier converts the amplified signal to a D.C. voltage which is applied to the drive motors for the mouth and the eyes of the bear. If desired, the cord can be connected to the bear by a removable connector so that the bear can be separated from the cord and carried about when not used in an interactive mode.

Program information and data for a multimedia presentation involving the bear are recorded on a CD-ROM 37 which is placed in drive 21. Such a presentation might, for example, include the bear as well as other characters who would appear on the screen and talk or otherwise interact with each other. The program permits a child or other person using the computer to interact with the characters by means of keyboard 13 and mouse 14. For example, the child might cause one of the characters to do a little dance or to say something by clicking on the on-screen image of the character with the mouse.

The audio signals for the sounds to be vocalized by the bear are directed to the left audio output channel, and the signals for all other sounds are directed to the right output channel. The sounds associated with the bear are thus reproduced by the speaker in the bear, and the mouth and eyes of the bear move in accordance with those sounds to enhance the appearance that they are being spoken by the bear. All other sounds, e.g. background music and the voices of the other characters, are reproduced by speaker 33 and appear to come from the characters on the screen. The bear thus has the appearance of speaking with the characters on the screen, and the child can interact with the bear and control what is said by the bear through the keyboard and mouse.

Figure 2:
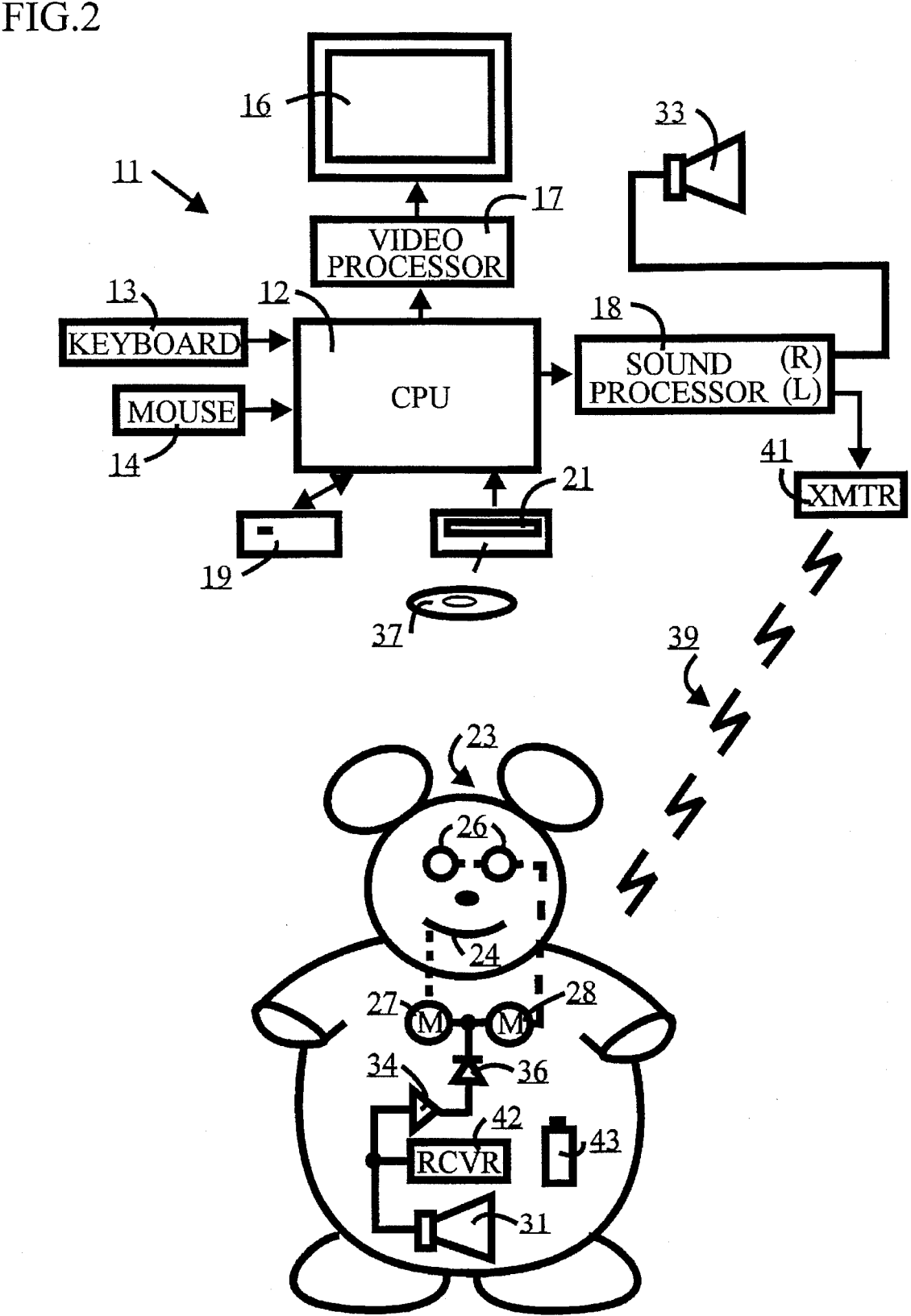
FIGS. 2 and 3 are block diagrams of other embodiments of an interactive system according to the invention.

The embodiment of FIG. 2 is similar to the embodiment of FIG. 1, and like reference numerals designate corresponding elements in the two embodiments. In the embodiment of FIG. 2, however, the umbilical cord is replaced by a wireless communications link 39. That link includes a low power radio transmitter 41 connected to the left output channel of the sound processor and a small radio receiver 42 mounted in the bear. The output of the receiver is applied to amplifier 34, and operating power for the receiver and amplifier is provided by a battery 43 mounted in the bear.

Operation and use of the embodiment of FIG. 2 is similar to that of FIG. 1 except the signals are transmitted between the computer and the bear over the wireless link rather than the umbilical cord. Without the cord, the bear has greater freedom and a somewhat more realistic appearance. The battery and the other components within the bear are covered with enough padding that they are not felt by a person holding the bear.

Figure 3:
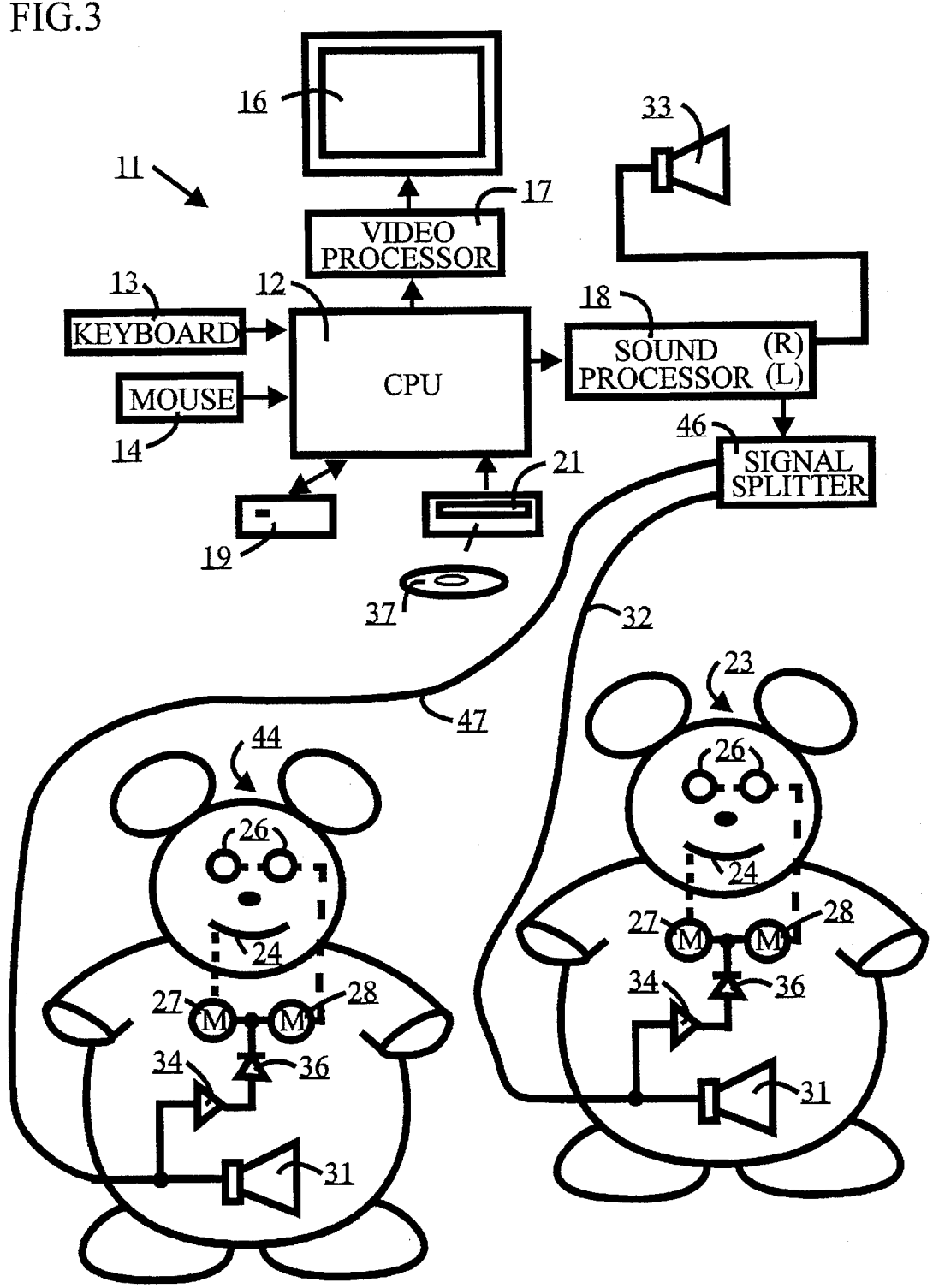

The embodiment of FIG. 3 is also similar to the embodiment of FIG. 1 and, in addition, includes a second doll 44. That doll is also illustrated as being in the form of a stuffed bear, but can be any figure or character desired. The second bear is illustrated as being similar to the first bear, and like reference numerals designate corresponding elements in the two bears. The second bear also has an internal speaker 31 and drive motors 27, 28 for moving its mouth and eyes.

Audio signals for the two bears are delivered to the left output channel (L), and a signal splitter 46 is connected to that channel to separate the signals for the two bears. In this embodiment umbilical cord 32 extends between the output of the splitter and the first bear, and a second umbilical cord 47 extends between the splitter and the second bear. If desired, the umbilical cords can be replaced with wireless links as in the embodiment of FIG. 2.

Figure 4:
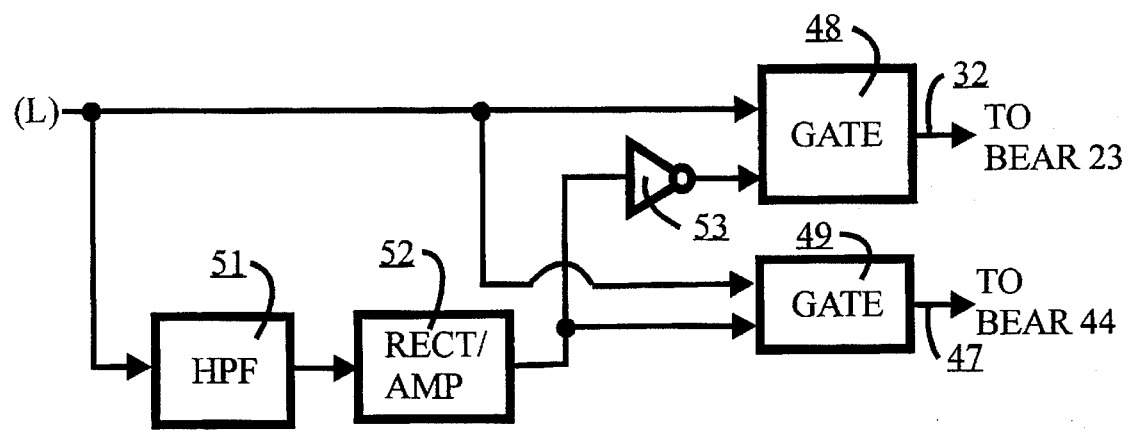
FIG. 4 is a block diagram of one embodiment of a signal splitter for use in the embodiment of FIG. 3.

FIG. 4 illustrates one embodiment of a signal splitter for use in the embodiment of FIG. 3. In this embodiment a marker tone of higher audio frequency than the program signals is included in the audio signals for the left channel whenever the signal for the second bear is present. The frequency response of the sound processor typically extends to about 20 KHz, whereas the voice signals for the bears have an upper frequency limit of about 5 KHz. A marker tone having a frequency in the upper part of the audio spectrum (e.g., 18–20 KHz) is preferred because it is readily separated from the voice signals and is high enough in frequency that it will not be heard by most people.

The splitter shown in FIG. 4 includes a pair of switching devices or gates 48, 49 which control passage of the audio signals to the umbilical cords. The audio signals from the left output channel are applied to the signal inputs of the gates and also to a high-pass filter 51 of known design which passes only the marker tone. The output of the filter is connected to the input of a rectifier/amplifier 52, and the output of the rectifier/amplifier is applied to the control inputs of the gates. An inverter 53 is provided between the output of the rectifier/amplifier and gate 48 so that the control signals applied to the two gates are out of phase with each other. Thus, when one gate is turned on to pass the audio signals, the other is turned off to block them.

In operation, the marker tone is present only when the audio signal for the second bear is present. The control signal provided when the tone is present opens gate 49, but not gate 48, and the audio signals are applied only to bear 44. When the tone is not present, the control signal opens gate 48 and closes gate 49, and the audio signals are applied only to bear 23. Thus, the two bears can appear to speak with each other and/or with other characters on the screen.

Figure 5:
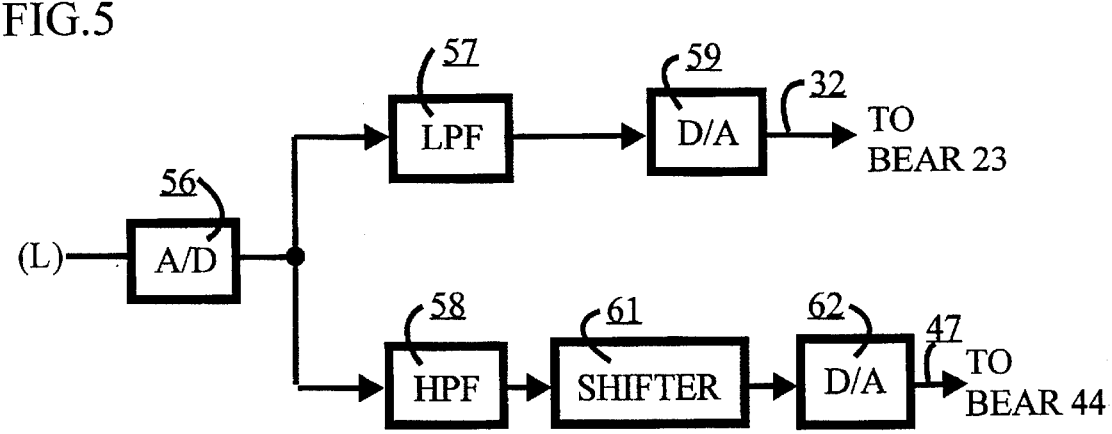
FIG. 5 is a block diagram of another embodiment of a signal splitter for use in the embodiment of FIG. 3.

FIG. 5 illustrates another embodiment of a splitter which utilizes digital signal processing (DSP) to separate the signals for the two bears. In this embodiment, the 0–5 KHz signals for the second bear are shifted or translated to the upper portion of the audio spectrum (e.g., 15–20 KHz) and delivered to the left output channel concurrently with the unshifted signals for the first bear. The splitter includes an A/D converter 56 which converts the audio signals from analog to digital form. The output of the converter is applied to a low-pass filter 57 which passes frequencies below about 10 KHz and a high-pass filter 58 which passes frequencies between about 10 KHz and 20 KHz. The output of the low-pass filter is applied to a D/A converter 59 which converts the signal back to analog form and applies it to umbilical cord 32 for delivery to the first bear.

The signal passed by high-pass filter 58 is applied to a shifter 61 which translates it back to its original frequency range (e.g., 0–5 KHz). That signal is then converted back to analog form by a D/A converter 62 and applied to umbilical cord 47 for delivery to the second bear.

In operation, signals for the first bear appear in the low frequency portion of the audio spectrum, and signals for the second bear are shifted to the high frequency portion of the spectrum. The signals for the two bears are separated by filters 57, 58, with the low frequency signals being passed through to the first bear and the high frequency signals being restored to their original frequencies and applied to the second bear.

While only two bears are actually shown in the embodiment of FIG. 3, a greater number of bears can be provided, if desired. With more bears, all that is required is a splitter or splitters which can separate the signals for the various bears. Such splitters are well known and can be of any suitable design. In the embodiment of FIG. 4, for example, additional bears can be accommodated simply by using different marker frequencies for the different bears.

Also, it should be understood that the two examples of splitters shown in FIGS. 4 and 5 are merely exemplary. Splitters can be implemented in a wide variety of other ways, and any suitable means can be employed for separating the signals for the different bears.

Figure 6:
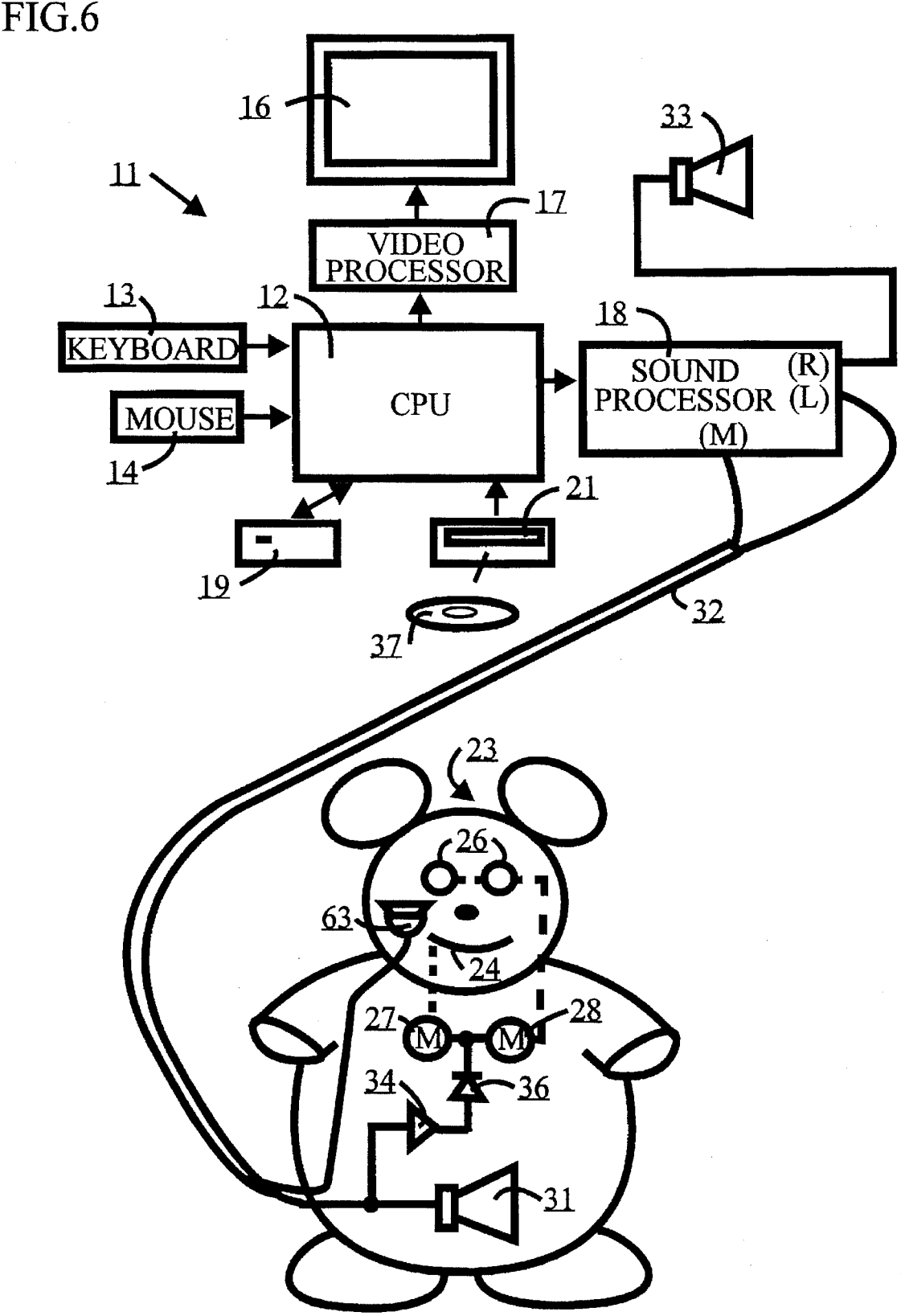
FIG. 6 is a block diagram of another embodiment of an interactive system according to the invention.

In the embodiment of FIG. 6, a microphone 63 is mounted in the bear near one of the bear's ears. Audio signals corresponding to sounds picked up by the microphone are transmitted to the microphone input (M) to the sound processor through a separate pair of conductors in the umbilical cord 32, and speech recognition software enables the computer to control the delivery of audio signals to the two output channels in accordance with words spoken into the microphone. A child can, thus, interact with the bear by talking to it.

The microphone and speech recognition software can, of course, be combined with the features of the other embodiments such as a plurality of dolls and a wireless link between the computer and the dolls.

It is apparent from the foregoing that a new and improved interactive system has been provided. While only certain presently preferred embodiments have been described in detail, as will be apparent to those familiar with the art, certain changes and modifications can be made without departing from the scope of the invention as defined by the following claims.

I claim:

1. In an interactive system:
   a computer having a video output display and first and second audio output channels,
   a program source containing information which is processed by the computer to provide a visual presentation on the display and audio signals in the audio output channels,
   at least one input device connected to the computer for controlling the manner in which the program information is processed and the audio signals are delivered to the audio output channels,
   a speaker connected to the computer for reproducing sounds represented by the audio signals in the first audio output channel, and
   an animated doll having a speaker disposed therein for reproducing audio sounds represented by the audio signals in the second audio output channel, an articulated element, and a transducer connected to the articulated element for moving that element in response to the audio signals in the second audio output channel.

2. The system of claim 1 including a wireless communication link between the second audio output channel and the transducer in the doll.

3. The system of claim 1 including a microphone carried by the doll, and speech recognition software executed by the computer for controlling the manner in which the program information is processed and the audio signals are delivered to the audio output channels in accordance with speech input from the microphone.

4. The system of claim 1 including a second doll and means for selectively applying signals from the second audio output channel to respective ones of the two dolls.

5. In an interactive system:
   a computer having a video output display and first and second audio output channels,
   a program source containing information which is processed by the computer to provide a visual presentation on the display and audio signals in the audio output channels,
   at least one input device connected to the computer for controlling the manner in which the program information is processed and the audio signals are delivered to respective ones of the audio output channels,
   a first speaker connected to the computer for reproducing sounds represented by the audio signals in the first audio output channel,
   first and second animated dolls each having at least one transducer responsive to audio signals, and
   means for selectively applying signals from the second audio output channel to the transducers in respective ones of the dolls.

6. The system of claim 5 wherein the transducer in each of the dolls comprises a speaker mounted in the doll for reproducing sounds represented by the audio signals in the second audio output channel.

7. The system of claim 5 wherein each of the dolls has an articulated element, and the transducer in each doll is connected to the articulated element in the doll for moving the element in response to the audio signals in the second audio output channel.

8. The system of claim 5 including a wireless communication link between the second audio output channel and the transducers in the dolls.

9. The system of claim 5 wherein a high frequency tone is delivered to the second audio output channel with an audio signal for the first doll, and the means for selectively applying signals to the dolls includes means responsive to the tone for applying the audio signals from the second audio output channel to the first doll when the tone is present and to the second doll when the tone is not present.

10. The system of claim 5 wherein audio signals for the first doll are delivered to the second audio output channel in a low frequency portion of the audio spectrum and audio signals for the second doll are shifted in frequency and delivered to the second audio output channel in a high frequency portion of the audio spectrum, and the means for selectively applying signals to the dolls includes means for applying the signals in the low frequency portion of the spectrum to the transducer in the first doll, means for shifting the signals for the second doll to the low frequency portion of the spectrum, and means for applying the shifted signals to the transducer in the second doll.

11. In an interactive system:
    a computer having a video output display and first and second audio output channels,
    a program source containing information which is processed by the computer to provide a visual presentation on the display and audio signals in the audio output channels,
    a speaker connected to the computer for reproducing sounds represented by the audio signals in the first audio output channel,
    an animated doll having at least one transducer responsive to the audio signals in the second audio output channel,
    a microphone carried by the doll and connected to the computer as an input device, and
    means programming the computer to control the manner in which the program information is processed and the audio signals are delivered to the audio output channels in accordance with speech input from the microphone.

12. The system of claim 11 wherein the transducer comprises a speaker mounted in the doll for reproducing sounds represented by the audio signals in the second audio output channel.

13. The system of claim 11 wherein the doll has an articulated element, and the transducer is connected to the articulated element for moving the element in response to the audio signals in the second audio output channel.

14. The system of claim 11 including a wireless communication link between the second audio output channel and the transducer in the doll.

15. The system of claim 11 including a second doll and means for selectively applying signals from the second audio output channel to respective ones of the two dolls.

16. The system of claim 15 wherein a high frequency tone is delivered to the second audio output channel with an audio signal for a first one of the dolls, and the means for selectively applying signals to the dolls includes means responsive to the tone for applying the audio signals from the second audio output channel to the first doll when the tone is present and to the second doll when the tone is not present.

17. The system of claim 15 wherein audio signals for a first one of the dolls are delivered to the second audio output channel in a low frequency portion of the audio spectrum and audio signals for the second doll are shifted in frequency and delivered to the second audio output channel in a high frequency portion of the audio spectrum, and the means for selectively applying signals to the dolls includes means for applying the signals in the low frequency portion of the spectrum to the transducer in the first doll, means for shifting the signals from the high frequency portion of the spectrum to the low frequency portion of the spectrum, and means for applying the shifted signals to the transducer in the second doll.

* * * * *